(12) United States Patent
Aoyama et al.

(10) Patent No.: US 7,716,810 B2
(45) Date of Patent: May 18, 2010

(54) METHOD OF MANUFACTURING A COMMUTATOR

(75) Inventors: Tomohiro Aoyama, Kosai (JP); Yasuhide Ito, Hamamatsu (JP); Toshio Yamamoto, Kosai (JP)

(73) Assignee: ASMO Co., Ltd., Kosai-shi, Shizuoka-ken (JP)

( * ) Notice: Subject to any disclaimer, the term of this patent is extended or adjusted under 35 U.S.C. 154(b) by 443 days.

(21) Appl. No.: 11/819,332

(22) Filed: Jun. 26, 2007

(65) Prior Publication Data

US 2008/0265708 A1 Oct. 30, 2008

(30) Foreign Application Priority Data

Jun. 28, 2006 (JP) ............... 2006-178378

(51) Int. Cl.
*H01R 43/06* (2006.01)
*H01R 43/10* (2006.01)

(52) U.S. Cl. ............... 29/597; 29/874; 29/876; 29/878; 310/233; 310/235; 310/236

(58) Field of Classification Search ............... 29/597, 29/874, 876, 878; 310/151, 204, 233, 235, 310/236, 402
See application file for complete search history.

(56) References Cited

U.S. PATENT DOCUMENTS 6,181,046 B1 * 1/2001 Daikoku et al. ............. 310/236

6,836,049 B2 * 12/2004 Terada et al. ............... 310/233
6,903,483 B2 * 6/2005 Yamamoto et al. .......... 310/233
2007/0069603 A1 3/2007 Terada et al.

FOREIGN PATENT DOCUMENTS

JP 2005-137193 5/2005
WO WO-2005/034315 4/2005

\* cited by examiner

*Primary Examiner*—Thiem Phan
(74) *Attorney, Agent, or Firm*—Pearl Cohen Zedek Latzer, LLP

(57) ABSTRACT

A method of manufacturing a commutator main body which has a cylindrical insulating body, and a plurality of segments arranged in an outer circumference of the insulating body. A short-circuit member is arranged in an end in an axial direction of the insulating body. The short-circuit member has a plurality of first short-circuit pieces and a plurality of second short-circuit pieces. A tabular insulating portion covers first coupling portions of the first short-circuit pieces, and second coupling portions of the second short-circuit pieces. The insulating portion has a restriction recess, and the end in the axial direction has a restriction projection. The restriction projection is engaged with the restriction recess, whereby the movement of the short-circuit member in the circumferential direction with respect to the commutator main body is restricted. Accordingly, the assembly of the short-circuit member in the commutator main body is facilitated.

1 Claim, 11 Drawing Sheets

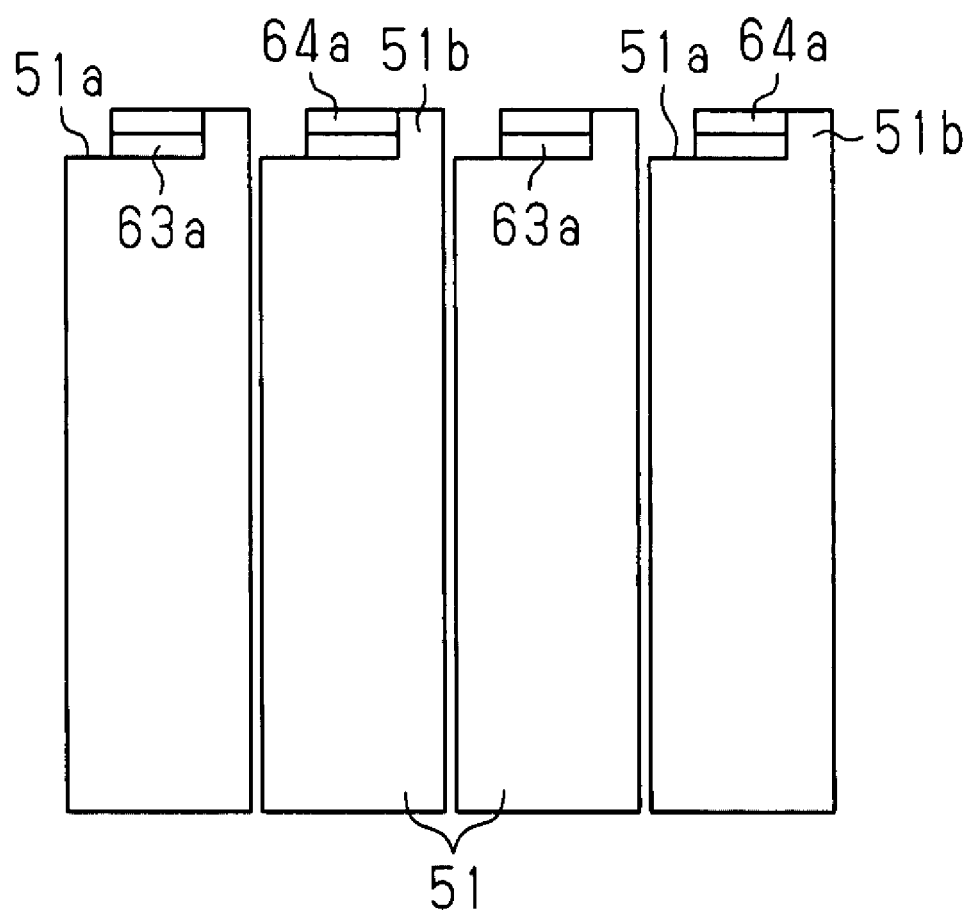

Fig.10
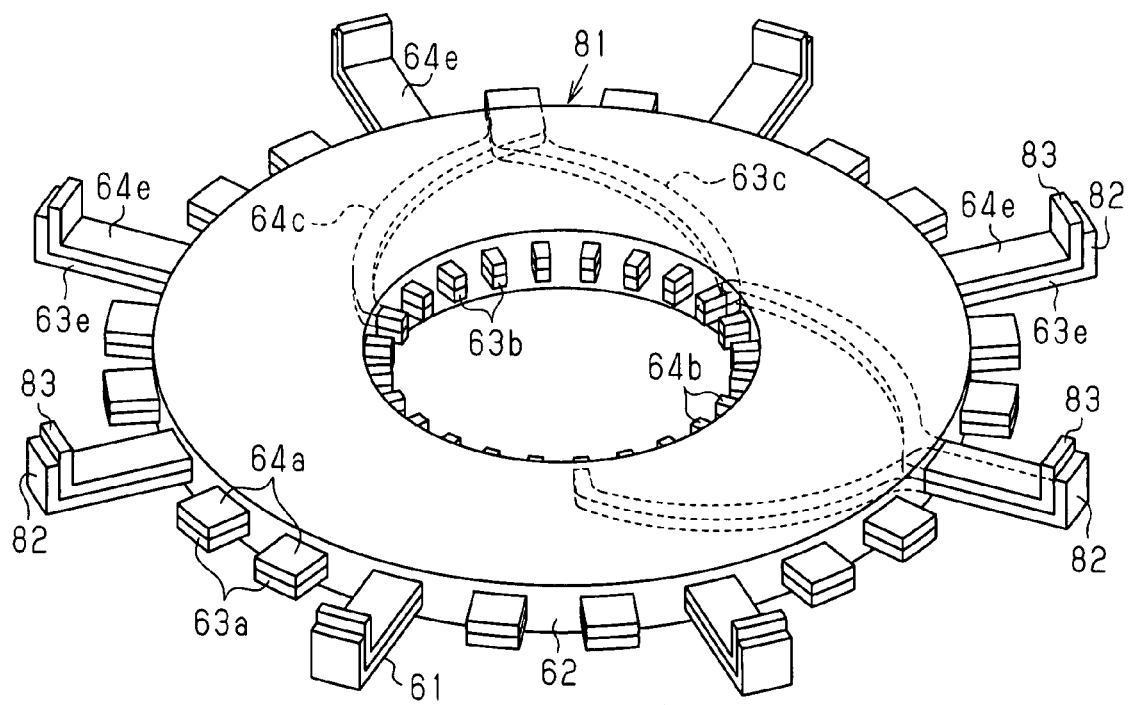
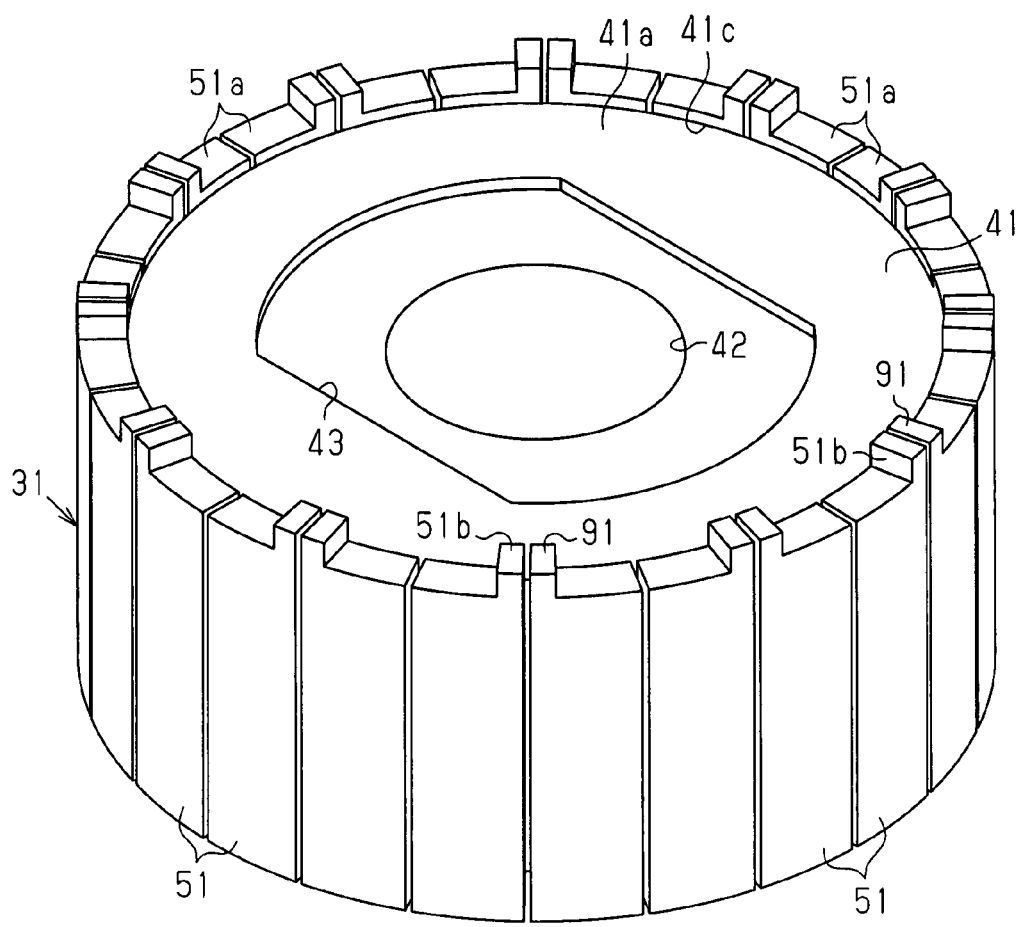

METHOD OF MANUFACTURING A COMMUTATOR

CROSS REFERENCE TO RELATED DOCUMENT

This application claims priority to Japanese Patent Application No. 2006-178378, filed on Jun. 28, 2006.

BACKGROUND OF THE INVENTION

The present invention relates to a commutator provided with a short-circuit member for short-circuiting a plurality of segments to be set to the same electric potential. Further, the present invention relates to a direct-current motor provided with the commutator, and further relates to a manufacturing method of the commutator.

A plurality of segments are arranged on an outer circumferential surface of a columnar commutator. In general, the number of the segments is set to a least common multiple of the number of magnetic poles (that is, the number of field poles) of magnets in a stator of a direct-current motor, and the number of teeth (that is, the number of salient magnetic poles) in an armature core. Japanese Laid-Open Patent Publication No. 2005-137193 discloses a plate-like short-circuit member for short-circuiting predetermined segments with each other.

FIG. 13 of the publication mentioned above discloses a first short-circuit member, and FIG. 17 of the publication mentioned above discloses a second short-circuit member. An end in an axial direction of each of the segments has a locking recess, and the first short-circuit member has the same number of locking projections as the segments. Each of the locking projections is inserted to the corresponding locking recess, and an arm defining the locking recess is swaged, so that the first short-circuit member is assembled in the segment.

The second short-circuit member has the same number of second locking projections as the segments. Each of the second locking projections protrudes radially outward. Each of the segments has a connection terminal protruding in an axial direction. The connection terminal is locked to the second locking projection in a circumferential direction, and is thereafter welded.

In order to downsize the dimension in the axial direction of the commutator, the short-circuit member is formed by a pressed product of a thin metal plate. Accordingly, the dimensional accuracy of the first-short-circuit member and the segments is not high, and if the positions of the locking projection and the locking recess are deviated, there is a risk that the short-circuit member is deformed in the case of engaging the first short-circuit member with the segment.

Further, if the second short-circuit member is simply arranged in the segment, the second short-circuit member tends to be circumferentially deviated from the segments. Accordingly, the assembly of the second short-circuit member with the segments is difficult.

SUMMARY OF THE INVENTION

An objective of the present invention is to facilitate assembly of a short-circuit member with segments.

In accordance with one aspect of the present invention, there is provided a commutator provided with a commutator main body. The commutator main body has a cylindrical insulating body, and a plurality of segments arranged in an outer circumference of the insulating body. The segments are arranged in a circumferential direction of the insulating body. The insulating body has an end in an axial direction. The short-circuit member is arranged in the end in the axial direction. The short-circuit member short-circuits several segments with each other so as to set them in the same electric potential. The short-circuit member is provided with a short-circuit portion having a first short-circuit group and a second short-circuit group. The first short-circuit group has the same number of first short-circuit pieces as the segments. The tabular first short-circuit pieces are arranged in the circumferential direction. Each of the first short-circuit pieces has a first radially outer end connected to the segment, a first radially inner end arranged at a position which is circumferentially deviated from and radially inside of the first radially outer end, and a first coupling portion coupling the first radially outer end to the first radially inner end. The second short-circuit group has the same number of second short-circuit pieces as the segments. The tabular second short-circuit pieces are arranged in the circumferential direction. Each of the second short-circuit pieces has a second radially outer end connected to the segment, a second radially inner end arranged at a position which is circumferentially deviated from and radially inside of the second radially outer end, and a second coupling portion coupling the second radially outer end to the second radially inner end. The first short-circuit group is laminated on the second short-circuit group in such a manner that each of the first radially outer ends is brought into contact with the second radially outer end, each of the first radially inner ends is brought into contact with the second radially inner end, and the first coupling portion comes into non-contact with the second coupling portion. As a result, a plurality of radially outer ends spaced at a uniform angle in the circumferential direction are set to the same electric potential. The tabular insulating portion covers the first coupling portion and the second coupling portion. One of the end in the axial direction and the insulating portion has a restriction recess, and the other has a restriction projection. The restriction projection can be engaged with the restriction recess so as to restrict a movement of the short-circuit member in the circumferential direction with respect to the commutator main body.

In accordance with the other aspect of the present invention, there is provided a manufacturing method of a commutator. The manufacturing method has a step of forming a first through hole and a second through hole respectively in a first radially outer end and a second radially outer end which are in a separated state from each other. The first radially outer end is overlapped with the corresponding second radially outer end, whereby the first through hole is connected with the second through hole, and a combined through hole is formed. A first opening of the combined through hole is closed by a layout surface corresponding to an end surface in an axial direction of the segment. A laser beam is irradiated to at least a part of a circumference of a second opening of the combined through hole, and the layout surface after passing through the combined through hole. As a result, the first radially outer end, the second radially outer end and the segment are bonded to each other.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 6 is a side view of the short-circuit members and the segments shown in FIG. 3;

FIG. 10 is an exploded perspective view of a commutator according to another embodiment;

DETAILED DESCRIPTION OF THE PREFERRED EMBODIMENT

FIGS. 1 to 7B show a direct-current motor 1 according to a first embodiment of the present invention.

Figure 1:
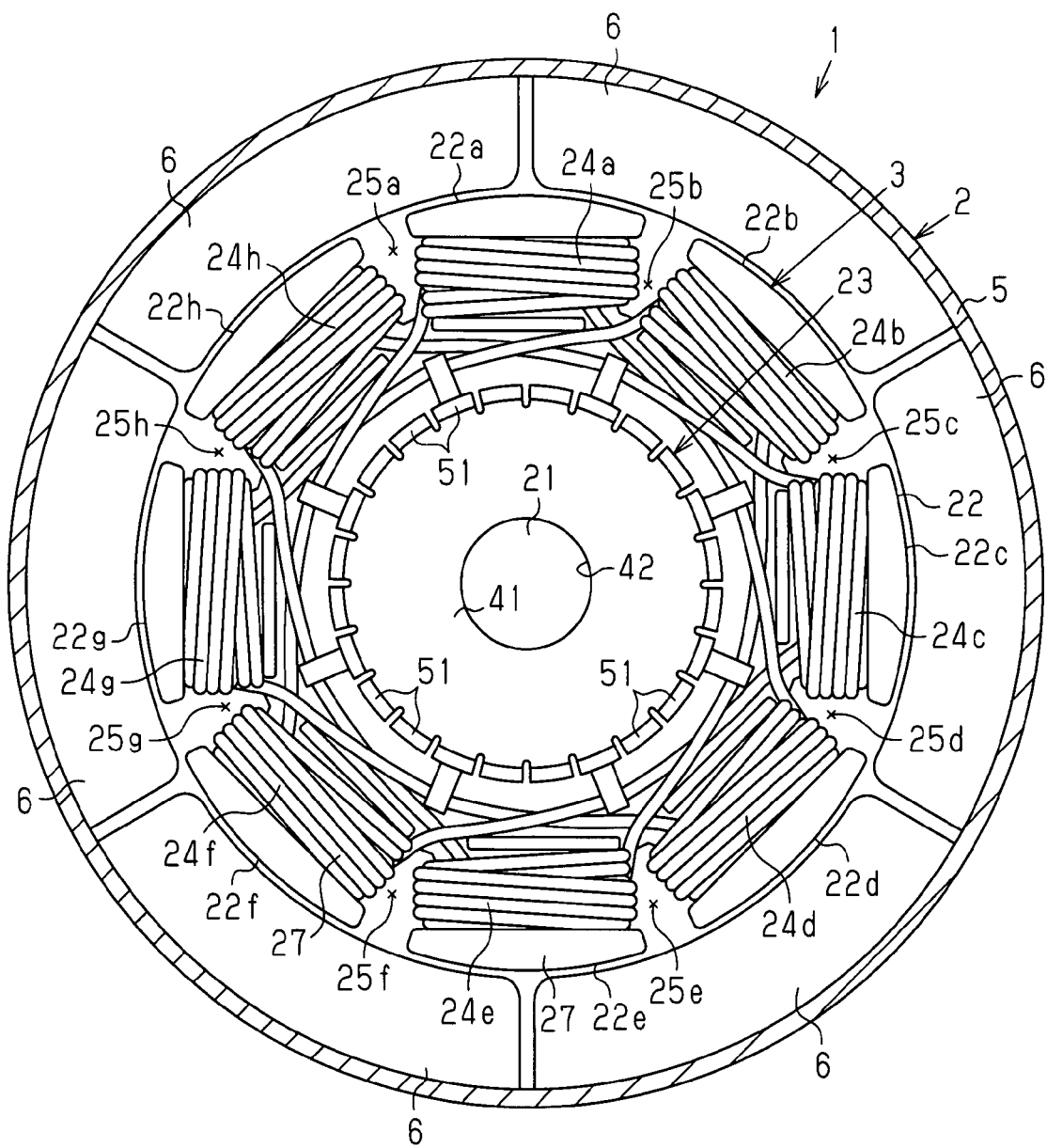
FIG. 1 is a transverse cross-sectional view of a direct-current motor according to a first embodiment of the present invention.

As shown in FIG. 1, the direct-current motor 1 is provided with a cylindrical stator 2, and an armature 3 arranged in an inner portion of the stator 2.

Figure 2:
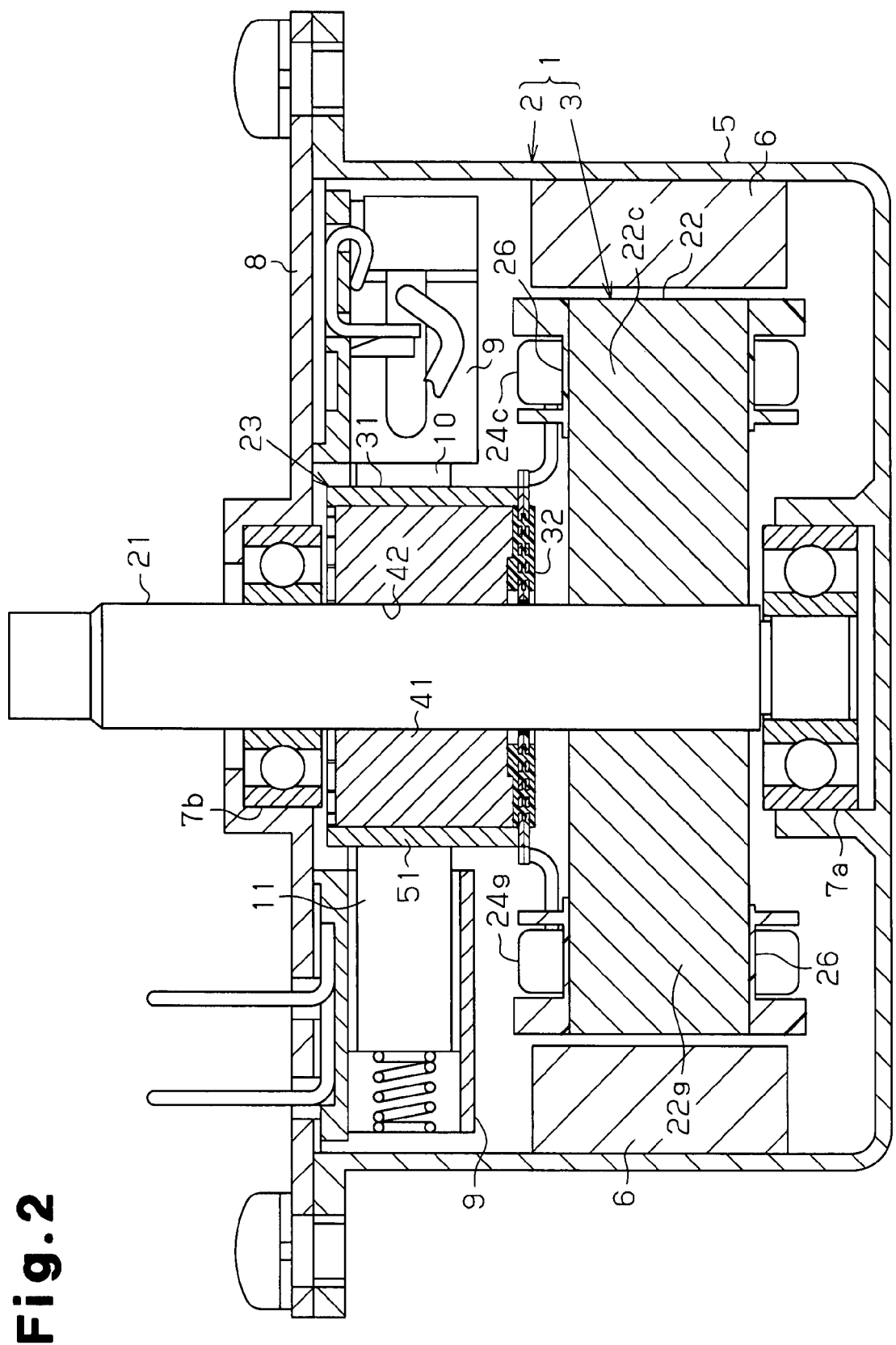
FIG. 2 is a longitudinal cross-sectional view of the motor in FIG. 1.

As shown in FIGS. 1 and 2, the stator 2 has a closed-end cylindrical yoke housing 5, and six magnets 6 arranged in an inner circumferential surface of the yoke housing 5. The magnets 6 are arranged at a uniform angular interval in the circumferential direction. The number of field poles of the stator 2 is six. A first bearing 7a is arranged in a center of a bottom portion of the yoke housing 5. An opening of the yoke housing 5 is closed by a disc-like end frame 8. A second bearing 7b is arranged in a center of the end frame 8. The end frame 8 has a pair of brush holders 9 accommodated in the yoke housing 5. The pair of rectangular tubular brush holders 9 respectively extending in a diametrical direction are arranged so as to be spaced at 180° in the circumferential direction. An anode brush 10 is accommodated in one of the brush holders 9, and a cathode brush 11 is accommodated in the other brush holder 9.

The armature 3 is arranged in an inner side of six magnets 6. The armature 3 has a rotary shaft 21, an armature core 22 attached to the rotary shaft 21, and a commutator 23 attached to the rotary shaft 21. The armature core 22 is arranged close to the first bearing 7a, and the commutator 23 is arranged close to the second bearing 7b. The first bearing 7a and the second bearing 7b rotatably support the rotary shaft 21 with respect to the stator 2. The armature core 22 has eight teeth 22a to 22h. As shown in FIG. 1, the teeth 22a to 22h extend from the rotary shaft 21 in a radial pattern. The teeth 22a to 22h which are adjacent to each other define slots 25a to 25h. Eight coils 24a to 24h are arranged in the slots 25a to 25h, respectively.

As shown in FIG. 2, a pair of insulators 26 are installed to the armature core 22 from both sides in the axial direction. Each insulator 26 covers an end in the axial direction of the armature core 22. A wire 27 is concentrically wound around each of the teeth 22a to 22h over the insulator 26. As a result, the coils 24a to 24h are formed. The number of salient magnetic poles of the armature 3 provided with eight coils 24a to 24h is eight.

As shown in FIG. 2, the commutator 23 is arranged between the armature core 22 and the second bearing 7b. The commutator 23 includes a cylindrical commutator main body 31, and a tabular short-circuit member 32 fixed to the commutator main body 31. The commutator main body 31 is directly fixed to the rotary shaft 21. The tabular short-circuit member 32 is fixed to an end in an axial direction of the commutator main body 31. The short-circuit member 32 is positioned between the commutator main body 31 and the armature core 22.

Figure 3:
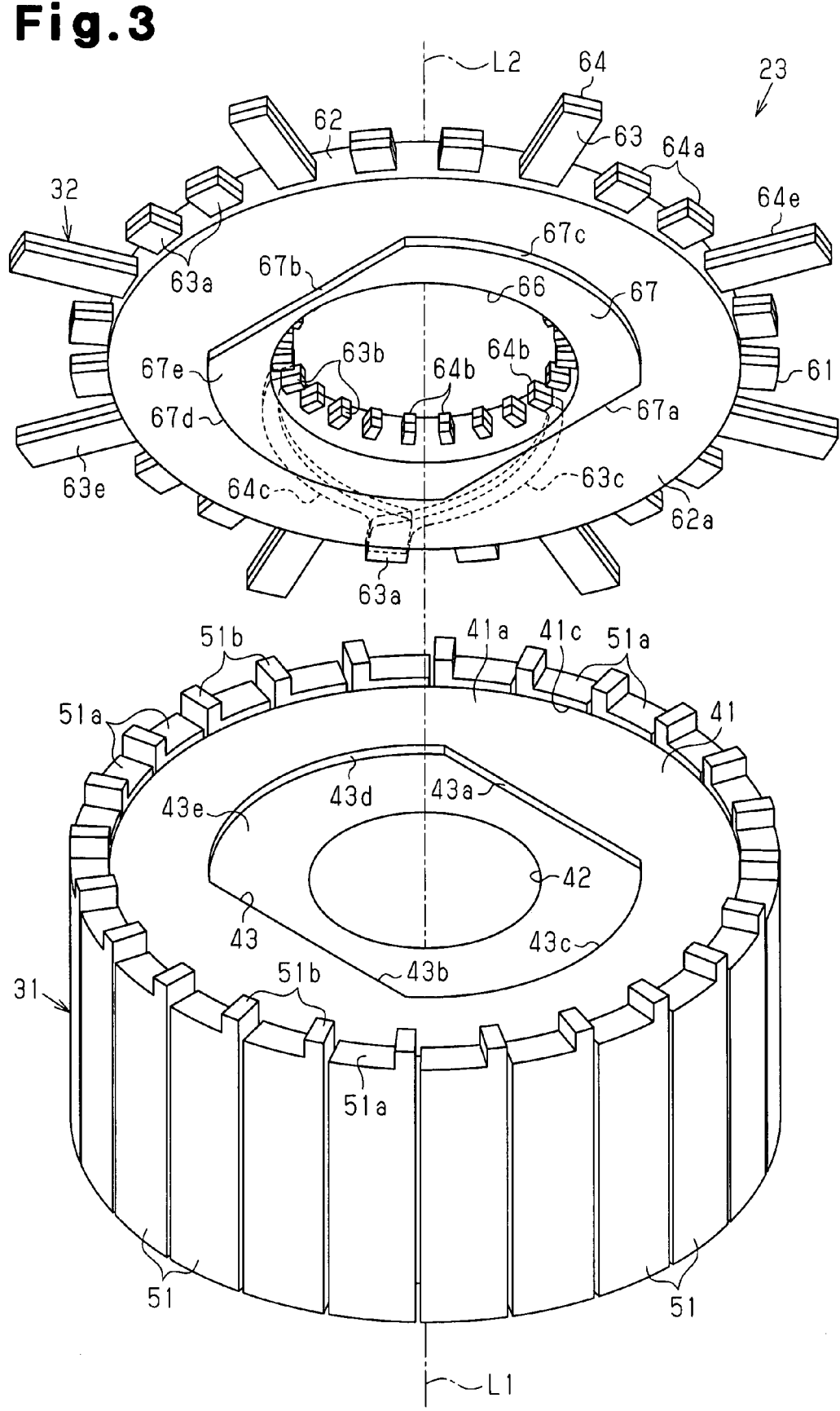
FIG. 3 is an exploded perspective view of the commutator shown in FIG. 2.

As shown in FIG. 3, the commutator main body 31 has a cylindrical insulating body 41 and a plurality of segments 51. Twenty-four segments 51 are arranged in an outer circumferential surface of the insulating body 41. The cylindrical insulating body 41 is made of a synthetic resin having an insulating property. The insulating body 41 has a press-fitting hole 42 extending through the axial direction. As shown in FIG. 2, the rotary shaft 21 is press-fitted to the press-fitting hole 42, whereby the commutator main body 31 is fixed to the rotary shaft 21. As shown in FIG. 3, the insulating body 41 has a first axial end surface 41a heading for the armature core 22. In FIG. 3, a top surface of the commutator main body 31 corresponds to the first axial end surface 41a. A restriction recess 43 is formed in a center portion of the first axial end surface 41a. The restriction recess 43 open in the axial direction is formed in an oval shape as seen from the axial direction. The restriction recess 43 is defined by a first flat side surface 43a, a second flat side surface 43b', a first arcuate side surface 43c, and second arcuate side surface 43d. The first and second flat side surfaces 43a and 43b are in parallel to each other. A first axis L1 corresponding to an axis of the insulating body 41 exists between the first flat side surface 43a and the second flat side surface 43b. Each of the first and second arcuate side surfaces 43c and 43d couples the first flat side surface 43a to the second flat side surface 43b. Each of the first and second arcuate side surfaces 43c and 43d is a arcuate having the same radius of curvature around the first axis L1. A bottom surface 43e of the restriction recess 43 is perpendicular to the first axis L1. Each of the first and second flat side surfaces 43a and 43b and the first and second arcuate side surfaces 43c and 43d is perpendicular to the bottom surface 43e.

Each of the segments 51 made of a conductive metal material is formed in a reed shape. Each of the segments 51 is formed in a curved shape extending along an outer circumferential surface of the insulating body 41. A longitudinal direction of each of the segments 51 agrees with the first axis L1. A gap exists between each circumferentially adjacent pair of the segments 51. Each of the segments 51 has a layout surface 51a corresponding to an axial end surface heading for the armature core 22. The layout surface 51a corresponds to a flat surface which is perpendicular to the first axis L1. The layout surface 51a exists in one end in the axial direction of each segment 51, and exists in an upper end of the segment 51 in FIG. 3. The layout surface 51a protrudes in the axial direction slightly than the first axial end surface 41a. Accordingly, the segments 51 define a loosely fit recess 41c for loosely fitting a part of the short-circuit member 32.

A connection pin 51b is formed in one end in the circumferential direction in each of the layout surfaces 51a, that is, a counterclockwise end of the layout surface 51a in FIG. 3. The connection pin 51b protrudes along the first axis L1. The dimension in the circumferential direction of the connection pin 51b is sufficiently smaller than the dimension in the circumferential direction of the layout surface 51a, and is one quarter of the dimension in the circumferential direction of the layout surface 51a, in the present embodiment. The connection pin 51b protrudes largely in the axial direction with respect to the first axial end surface 41a.

Figure 4:
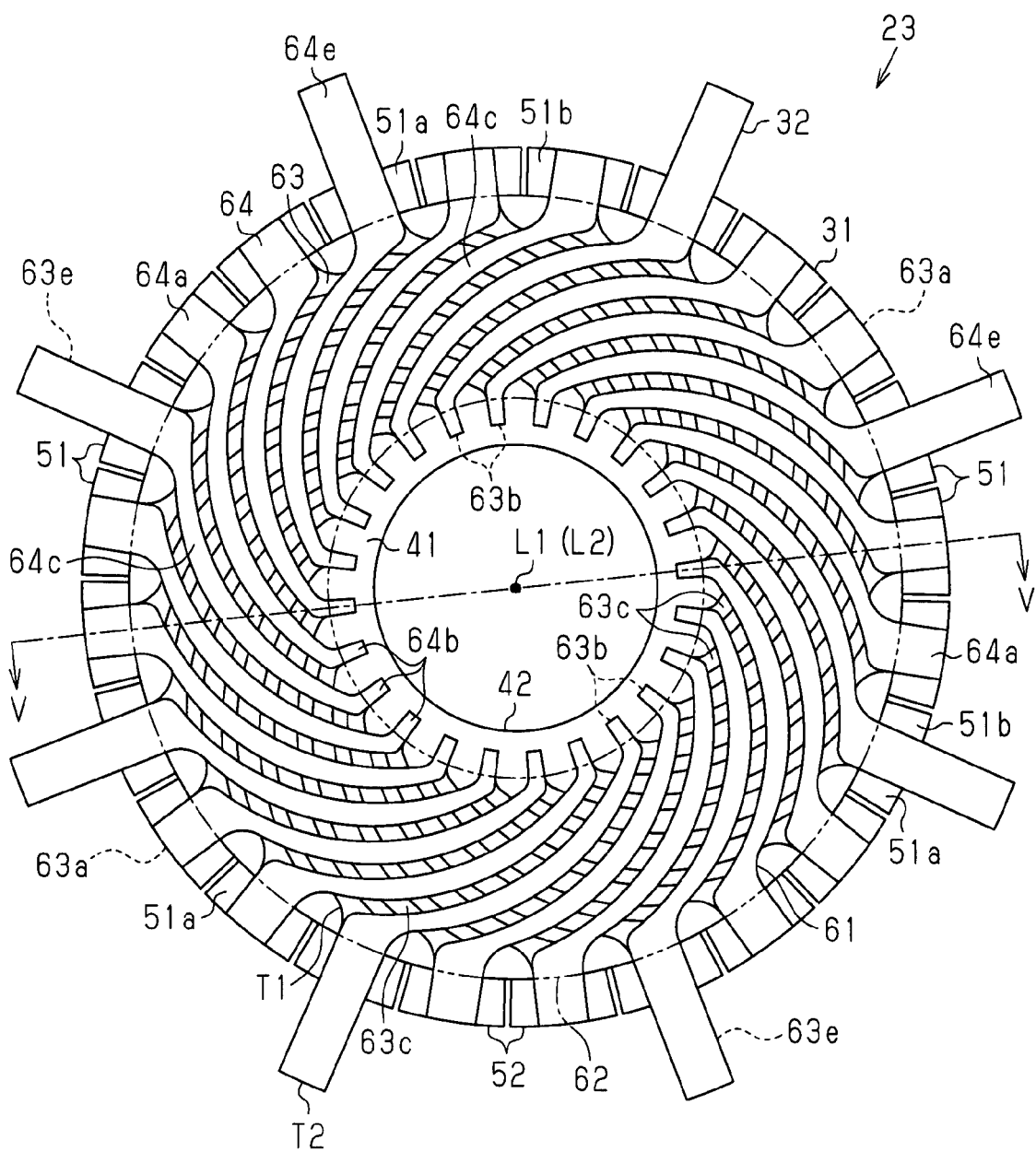
FIG. 4 is a bottom view of the commutator in FIG. 3.
Figure 5:
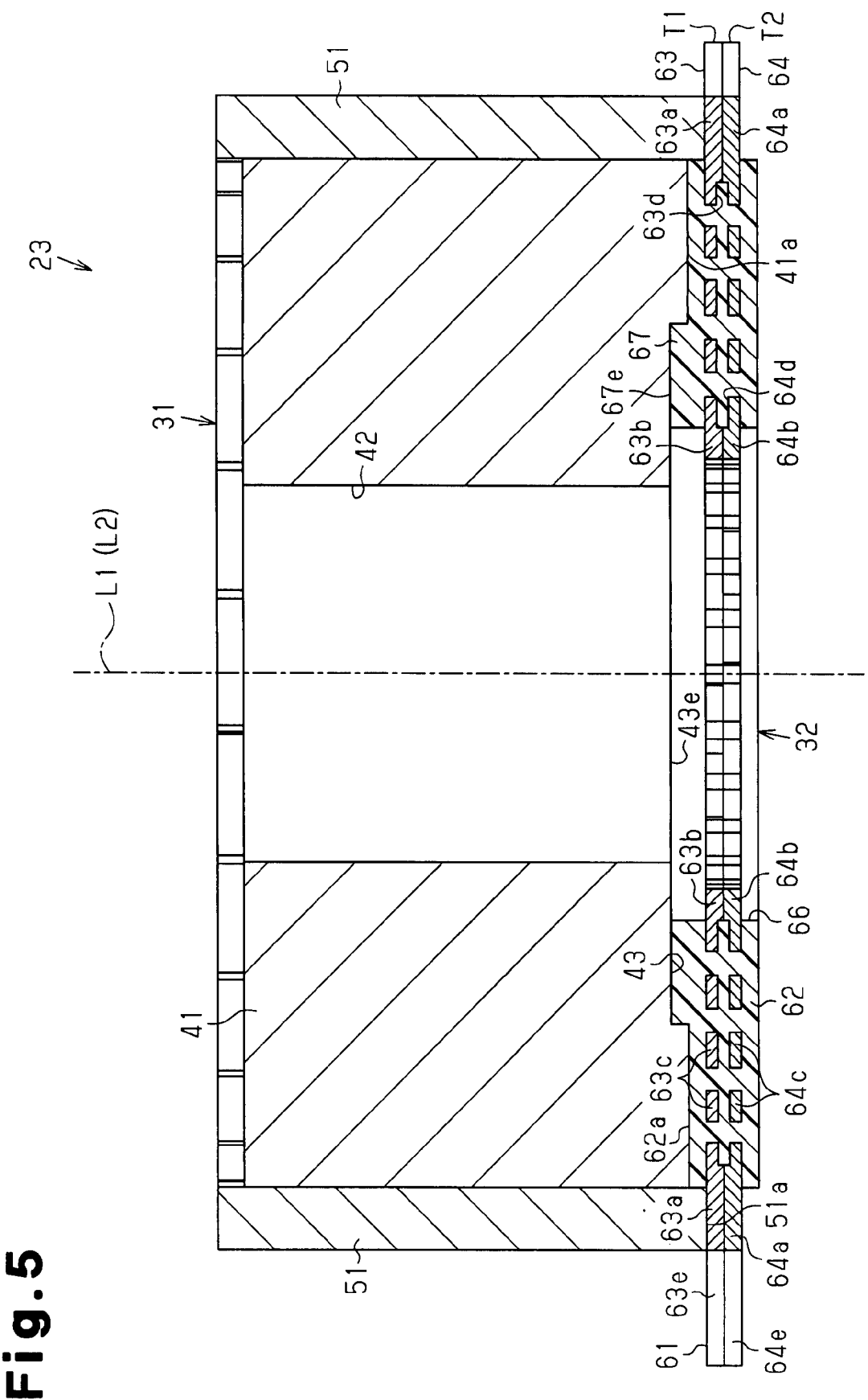
FIG. 5 is a cross-sectional view taken along line V-V of the commutator in FIG. 4.

As shown in FIGS. 4 and 5, the short-circuit member 32 includes a tabular short-circuit portion 61, and an insulating portion 62 partly molding the short-circuit portion 61. In the present embodiment, the short-circuit portion 61 short circuits the segments 51 at an interval of 120° with each other.

The short-circuit portion 61 includes a first short-circuit group T1 and a second short-circuit group T2. The first short-circuit group T1 includes the same number of (that is, twenty-four) first short-circuit pieces 63 as the segments 51. The first short-circuit pieces 63 are arranged in the circumferential direction. The second short-circuit group T2 includes the same number of (that is, twenty-four) second short-circuit pieces 64 as the segments 51. The second short-circuit pieces 64 are arranged in the circumferential direction in such a manner as to be opposed to the first short-circuit pieces 63. The first short-circuit pieces 63 are positioned between the segments 51 and the second short circuit pieces 64. The first short-circuit pieces 63 come into contact with the layout surface 51a.

As shown in FIG. 4, each of the first short-circuit pieces 63 integrally has a first radially outer end 63a, a first radially inner end 63b, and a first coupling portion 63c. Each first radially outer end 63a is arranged in the layout surface 51a of the corresponding segment 51. Each first radially inner end 63b is arranged radially inside of the corresponding first radially outer end 63a. Each first coupling portion 63c is formed in a curved shape coupling one of the first radially outer ends 63a to the corresponding first radially inner end 63b.

As shown in FIG. 4, each of the first radially outer ends 63a is formed in a rectangular plate shape. The dimension in the circumferential direction of each first radially outer end 63a is smaller than the dimension in the circumferential direction of the layout surface 51a. Each of the first radially inner ends 63b is formed in a trapezoidal plate shape, and is smaller than the first radially outer ends 63a. Each first coupling portion 63c is formed in an involute curved shape coupling one of the first radially outer ends 63a to the corresponding first radially inner end 63b which is away at 60° in the circumferential direction. Referring to FIG. 4, when the commutator 23 is viewed from the short-circuit member 32, the phase of each first radially inner end 63b is deviated from the corresponding first radially outer end 63a at 60° in a clockwise direction.

As shown in FIG. 5, each first coupling portion 63c is thinner than the first radially outer ends 63a and the first radially inner ends 63b. In other words, a first separation recess 63d open to a thickness direction (the same direction as the direction of the first axis L1) exists in each first coupling portion 63c.

As shown in FIGS. 4 and 5, twenty-four first short-circuit pieces 63 are arranged so as to be spaced in the circumferential direction. The first short-circuit pieces 63 are arranged on the same plane by being arranged on the layout surface 51a. A first riser 63e extends radially outward from some of the first radially outer ends 63a that are arranged every 45° in the circumferential direction. The first short-circuit piece 63 is formed as a tabular shape obtained by pressing a metal plate having a conductivity, for example, a copper plate.

As shown in FIG. 4, the second short-circuit piece 64 is formed in a line symmetrical shape with the first short-circuit piece 63. Each of the second short-circuit pieces 64 integrally has a second radially outer end 64a, a second radially inner end 64b and a second coupling portion 64c. The second radially outer ends 64a are arranged on the first radially outer ends 63a. The second radially inner end 64b is arranged radially inside of the second radially outer end 64a. The second coupling portions 64c couple the second radially outer ends 64a to the second radially inner ends 64b. As shown in FIGS. 3 and 4, a plurality of first short-circuit pieces 63 swirl in the clockwise direction from the first radially outer ends 63a toward the first radially inner ends 63b, and a plurality of second short-circuit pieces 64 swirl in the counterclockwise direction from the second radially outer ends 64a toward the second radially inner ends 64b. When the commutator 23 is viewed from the short-circuit member 32, the second radially inner end 64b is away from the second radially outer end 64a at 60° in the counterclockwise direction with respect to the second radially outer end 64a. As shown in FIG. 5, each second coupling portion 64c is thinner than the second radially outer end 64a and the second radially inner end 64b. In other words, each second coupling portion 64c has a second separation recess 64d open in the thickness direction.

A second riser 64e extends radially outward from some of the second radially outer ends 64a that are arranged every 45°. The second short-circuit pieces 64 are formed in a tabular shape obtained by pressing a copper plate in the same manner as the first short-circuit piece 63.

Each of the first radially outer ends 63a is brought into contact (surface contact) with and welded to the corresponding second radially outer end 64a. Each of the first radially inner ends 63b is brought into contact (surface contact) with and welded to the corresponding second radially inner end 64b. An opening of the first separation recess 63d is opposed to an opening of the second separation recess 64d. The first coupling portions 63c are in non-contact with the second coupling portions 64c in the thickness direction. The inner diameter of the short-circuit portion 61, that is, the diameter of an imaginary circle passing through the first radially inner ends 63b and the second radially inner ends 64b is larger than the diameter of the press-fitting hole 42 in the insulating body 41.

The first radially outer ends 63a are electrically connected to the second radially outer ends 64a. Accordingly, each first radially outer end 63a is electrically connected to the corresponding second radially outer end 64a spaced at 120° in the circumferential direction via a first coupling portion 63c and a second coupling portion 64c.

As shown in FIGS. 3 and 5, the insulating portion 62 is made of a synthetic resin material having an insulating property. The insulating portion 62 is formed in an annular plate shape, and covers the first coupling portions 63c and the second coupling portions 64c. The first coupling portions 63c and the second coupling portions 64c exist in an inner portion of the insulating portion 62. The rotary shaft 21 is inserted to an insertion hole 66 in a center portion of the insulating portion 62. The thickness (the dimension in the axial direction) of the insulating portion 62 is larger than the thickness of the short-circuit portion 61. The thickness of the short-circuit portion 61 corresponds to the sum of the thickness of the first short-circuit pieces 63 and the thickness of the second short-circuit pieces 64. The resin material constructing the insulating portion 62 fills the first separation recesses 63d in the first short-circuit pieces 63, and the second separation recesses 64d in the second short-circuit pieces 64. Further, the resin material fills a space between the first coupling portions 63c, and a space between the second coupling portions 64c. Accordingly, it is possible to prevent the first coupling portions 63c from short-circuiting with the second coupling portions 64c. Further, it is possible to prevent short-circuit between the first coupling portions 63c and the short-circuit between the second coupling portions 64c.

As shown in FIGS. 3 and 5, the insulating portion 62 has a second axial end surface 62a heading for the insulating body 41. A restriction projection 67 protruding in an axial direction is formed in a center portion of the second axial end surface 62a. The restriction projection 67 is formed in an oval shape as seen from the axial direction. In other words, the restriction projection 67 is formed in a shape corresponding to the restriction recess 43 of the insulating body 41. The restriction projection 67 is formed in an annular shape surrounding the insertion hole 66, and extends continuously in the circumferential direction. The restriction projection 67 laps over all the first coupling portions 63c and all the second coupling portions 64c in the axial direction. The restriction projection 67 has a distal end surface 67e which is perpendicular to a second axis L2 corresponding to an axis of the short-circuit member 32. A side surface of the restriction projection 67 has a third flat side surface 67a, a fourth flat side surface 61b, a third arcuate side surface 67c, and a fourth arcuate side surface 67d. The second axis L2 exists between the third flat side surface 67a and the fourth flat side surface 67b which are in parallel to each other. Each of the third and fourth arcuate side surfaces 67c and 67d couples the third flat side surface 67a to the fourth flat side surface 67b. Curvatures of the third and fourth arcuate side surfaces 67c and 67d are respectively equal to the curvatures of the first and second arcuate side surfaces 43c and 43d. The distal end surface 67e is perpendicular to the third and fourth flat side surfaces 67a and 67b, and the third and fourth arcuate side surfaces 67c and 67d. The dimension in the axial direction of the restriction projection 67 is equal to or less than a depth of the restriction recess 43.

The short-circuit member 32 is assembled in the commutator main body 31 in such a manner that the restriction projection 67 is engaged with the restriction recess 43. In a state in which the restriction projection 67 is engaged with the restriction recess 43, the first flat side surface 43a is brought into contact with the third flat side surface 67a. The second flat side surface 43b is brought into contact with the fourth flat side surface 67b. The first arcuate side surface 43c is brought into contact with the third arcuate side surface 67c, and the second arcuate side surface 43d is brought into contact with the fourth arcuate side surface 67d. Accordingly, the rotation of the short-circuit member 32 in the circumferential direction with respect to the commutator main body 31 is prevented. In other words, the restriction projection 67 is engaged with the restriction recess 43, whereby the short-circuit member 32 can not be rotated with respect to the commutator main body 31.

In a state in which the restriction projection 67 is engaged with the restriction recess 43, whereby the short-circuit member 32 is assembled in the commutator main body 31, the first axis L1 comes into line with the second axis L2. The flat short-circuit member 32 is perpendicularly expanded in the direction of the first axis L1. As shown in FIG. 6, each of the first radially outer end 63a and the second radially outer end 64a is arranged on the layout surface 51a of the corresponding segment 51. The end surface in the circumferential direction of each of the first radially outer end 63a and the second radially outer end 64a is brought into contact with the corresponding connection pin 51b on the layout surface 51a. The restriction projection 67 and the restriction recess 43 are formed in such a manner that a state shown in FIG. 6 is achieved. Each first radially outer end 63a, the corresponding second radially outer end 64a, and the corresponding connection pin 51b are electrically connected to each other by being laser welded to each other. As a result, the segments 51 spaced at 120° are electrically connected to each other.

Figure 7A:
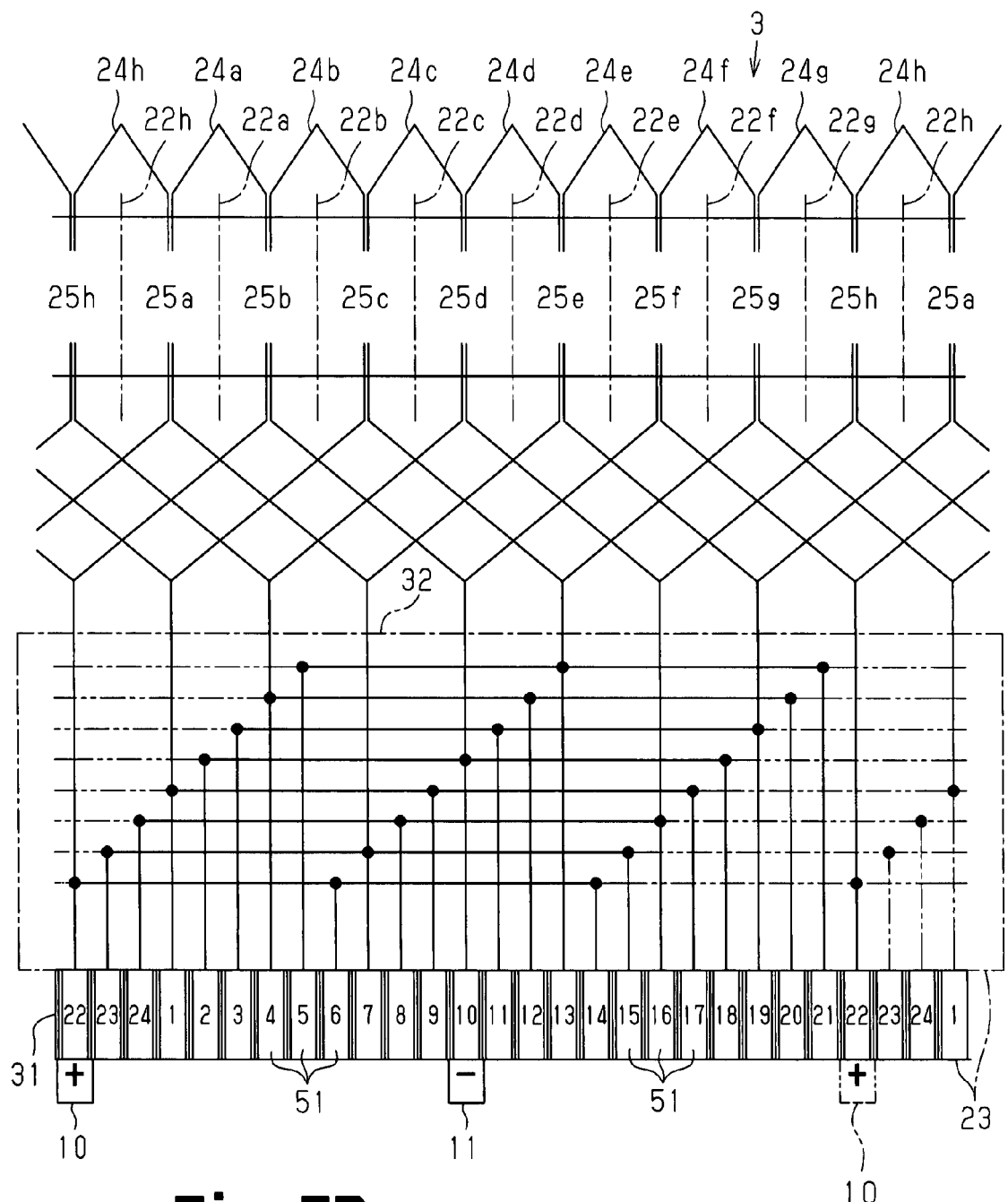
FIG. 7A is a development view of the electrical construction of the motor in FIG. 1.
Figure 7B:
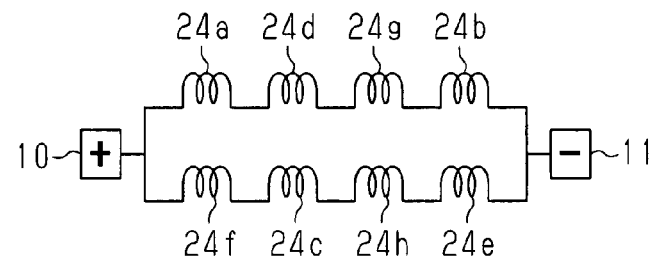
FIG. 7B is a circuit diagram showing a connection state of the coil shown in FIG. 1.

As shown in FIG. 7A, a number "1" is attached to the segment 51 existing between the first tooth 22a and the eighth tooth 22h, and numbers "2" to "24" are attached to the other segments 51 in sequence. The short-circuit member 32 short-circuits the first, ninth and seventeenth segments 51, which are spaced at 120° with each other, and sets them at the same electric potential. In the same manner, the short-circuit member 32 short-circuits the second, tenth and eighteenth segments 51 with each other, short-circuits the third, eleventh and nineteenth segments 51 with each other, short-circuits the seventh, fifteenth and twenty-third segments 51 with each other, and short-circuits the eighth, sixteenth and twenty-fourth segments 51 with each other. An end portion of each of the coils 24a to 24h is locked to the corresponding first riser 63e or second riser 64e, and is electrically connected to the first or second riser 64e. In other words, as schematically shown in FIG. 7B, all the coils 24a to 24h construct an electric loop.

As shown in FIG. 2, the anode brush 10 and the cathode brush 11 come into slidable contact with the commutator 23 from the radially outer side. If an external power supply feeds an electric current to the coils 24a to 24h through the anode brush 10 and the cathode brush 11, the coils 24a to 24h generate a rotating magnetic field. As a result, the armature 3 is rotated. The anode brush 10 and the cathode brush 11 sequentially come into-slidable contact with the segments 51 on the basis of the rotation of the commutator 23. Accordingly, the electric current is rectified.

The present embodiment has the following advantages.

(1) The restriction projection 67 is engaged with the restriction recess 43, whereby the movement of the short-circuit member 32 in the circumferential direction with respect to the commutator main body 31 is restricted. In other words, the short-circuit member 32 is positioned in the circumferential direction with respect to the commutator main body 31, only by engaging the restriction projection 67 with the restriction recess 43. Accordingly, it is easy to connect the first and second radially outer ends 63a and 64a to the corresponding segments 51. In other words, in the present embodiment, it is not necessary to form a recess in each of the segments 51 as is different from the conventional structure, and it is not necessary to form a locking portion locking to the recess in the first and second radially outer ends 63a and 64a. Accordingly, it is possible to inhibit the constructing member of the short-circuit member 32 from being deformed in positioning the short-circuit member 32 in the circumferential direction with respect to the commutator main body 31. In other words, it is possible to suppress the deformation of the first and second coupling portions 63c and 64c. Therefore, it is possible to facilitates the assembly of the short-circuit member 32 in the commutator main body 31, and it is possible to reduce the deformation of the short-circuit member 32 at a time of assembling. As a result, it is possible to improve the yield of the direct-current motor 1.

(2) Each connection pin 51b protrudes in the axial direction from the layout surface 51a of the end surface in the axial direction of the corresponding segment 51. Each of the connection pins 51b exists in one end in the circumferential direction in the corresponding layout surface 51a. Accordingly, it is possible to easily connect the short-circuit member 32 to the segments 51 by bringing the end surfaces in the circumferential direction of the first and second radially outer ends 63a and 64a into contact with the connection pin 51b, and bonding them.

Each connection pin 51b is positioned at one end in the circumferential direction of the layout surface 51a of the corresponding segment 51. Accordingly, the present embodiment is different from the prior art in which the connection terminal is locked and inserted to the recess between a pair of arms, and tends to allow the displacement in the circumferential direction of the short-circuit member 32 with respect to the commutator main body 31. As a result, it is possible to suppress the deformation of the constructing member of the short-circuit member 32.

Further, the number of the connection pin 51b provided in each segment 51 is one. Accordingly, it is easy to prevent short-circuit between the segments 51 which are adjacent to each other in the circumferential direction.

(3) The restriction projection 67 is provided in the insulating portion 62. Accordingly, since the thickness of the insulating portion 62 is increased, and the short-circuit member 32 is reinforced, the short-circuit member 32 is hard to be deformed.

(4) The restriction projection 67 is arranged in such a manner as to correspond to the first and second coupling portions 63c and 64c in the axial direction. The first coupling portions 63c of the first short-circuit group T1 are in non-contact with the second coupling portions 64c of the second short-circuit group T2 in a laminating direction. In contrast, each first radially outer end 63a comes into contact with the corresponding second radially outer end 64a, and each first radially inner end 63b comes into contact with the corresponding second radially inner end 64b. In other words, there is a risk that the strength becomes lower in the portion of the short-circuit member 32 corresponding to the first and second coupling portions 63c and 64c, in comparison with the portion of the short-circuit member 32 corresponding to the first and second radially outer ends 63a and 64a, and the portion of the short-circuit member 32 corresponding to the first and second radially inner ends 63b and 64b. However, the restriction projection 67 reinforces the portion of the short-circuit member 32 corresponding to the first and second coupling portions 63c and 64c.

(5) The restriction projection 67 is formed in the annular shape. In other words, the restriction projection 67 extends continuously in the circumferential direction. Accordingly, the short-circuit member 32 is hard to be deformed, for example, in comparison with the case that a plurality of restriction projections 67 intermittently exist in the circumferential direction.

(6) Each of the restriction recess 43 and the restriction projection 67 is formed in the oval shape as seen from the axial direction. Accordingly, each of the restriction recess 43 and the restriction projection 67 is formed in a simple shape. In other words, the present embodiment inhibits the rotation in the circumferential direction of the commutator main body 31 with respect to the short-circuit member 32 while preventing the shape of the short-circuit member 32 from being complicated.

The embodiment mentioned above may be modified as follows.

The restriction recess 43 and the restriction projection 67 are not limited to be formed in the oval shape as seen from the axial direction.

Each of the restriction recess 43 and the restriction projection 67 may be formed in a circular shape which is notched so as to have a straight line portion in a part as seen from the axial direction. Further, the restriction recess 43 and the restriction projection 67 may be formed in a polygonal shape as seen from the axial direction. The restriction recess 43 and the restriction projection 67 are not limited to exist respectively in the center portions of the corresponding first and second axial end surfaces 41a and 62a, but may be arranged so as to be eccentric in the first and second axial end surfaces 41a and 62a. In the case of being eccentric, each of the restriction recess 43 and the restriction projection 67 may be formed in a circular shape as seen from the axial direction.

The number of the restriction recess 43 is not limited to one, but a plurality of restriction recesses 43 may be provided. The number of the restriction projection 67 is not limited to one, but a plurality of restriction projections 67 may be provided.

The welding of the first radially outer ends 63a, the second radially outer ends 64a, and the connection pins 51b is not limited to the laser welding, but the welding using tungsten inert gas (Tig) may be employed. In other words, the short-circuit member 32 may be welded to the segments 51 in accordance with the Tig welding.

Figure 8:
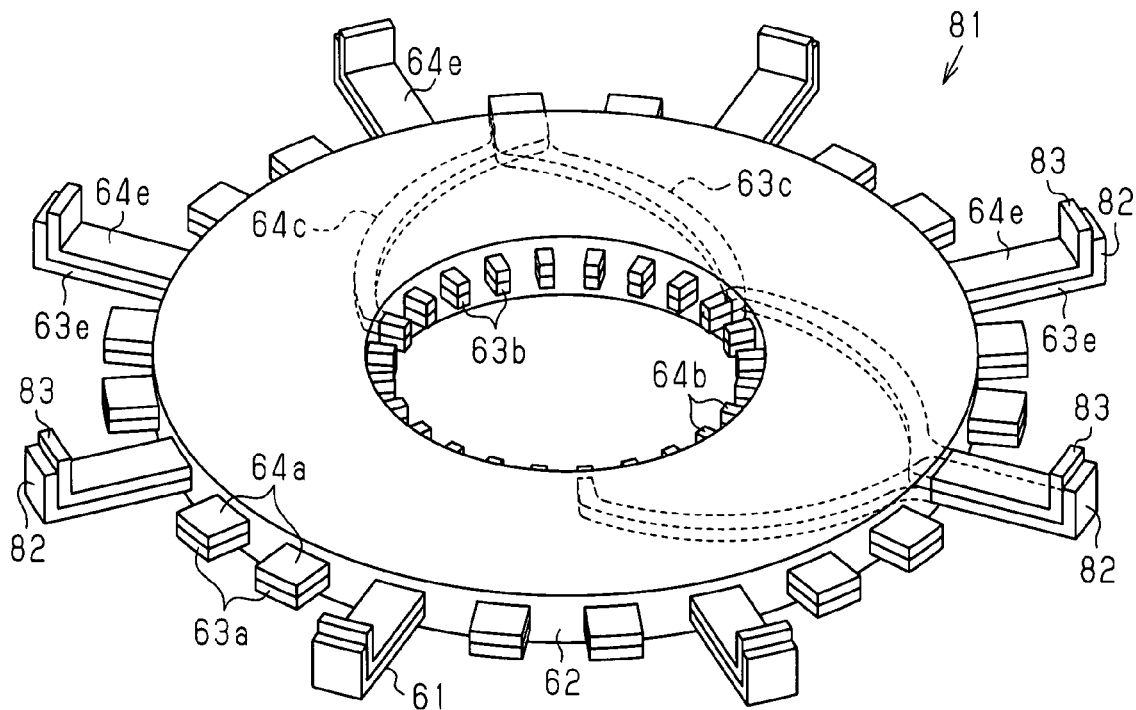
FIG. 8 is a perspective view of a short-circuit member according to another embodiment.

In place of the short-circuit member 32 shown in FIG. 3, a short-circuit member 81 shown in FIG. 8 may be assembled in the commutator main body 31. The short-circuit member 81 has a plurality of first coil winding locking portions 82 and a plurality of second coil winding locking portions 83. Each of the first and second coil winding locking portions 82 and 83 extends in the axial direction from the radially outer end of each of the corresponding first and second risers 63e and 64e. The end portions of the coils 24a to 24h are respectively wound around the corresponding first and second coil winding locking portions 82 and 83, thereby being easily connected to the first riser 63e and the second riser 64e.

Figure 9:
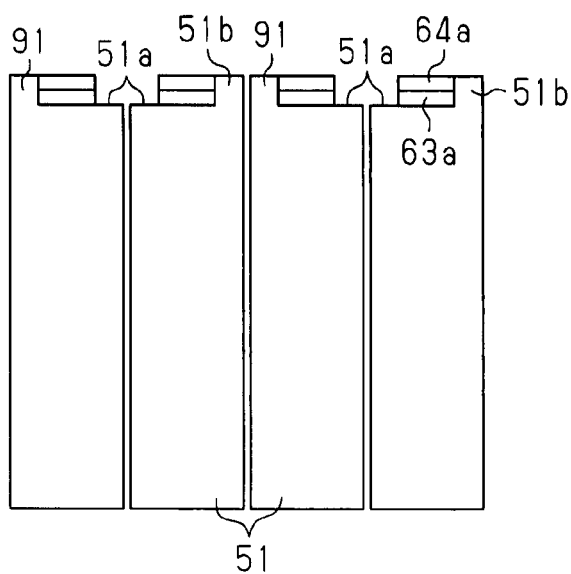
FIG. 9 is a side view of a short-circuit member and segments in a commutator according to another embodiment.

As shown in FIGS. 9 and 10, it is possible to alternately arrange the segments 51 having the connection pins 51b, and the segments 51 having the connection pins 91 in the circumferential direction. Each connection pin 91 is adjacent to one of the connection pins 51b. In other words, while each connection pin 51b is arranged in the first end (the counterclockwise end in FIG. 3) in the circumferential direction in the layout surface 51a, the corresponding connection pin 91 is arranged in the second end (the clockwise end in FIG. 3) in the circumferential direction of the layout surface 51a. It is possible to obtain the same advantage as the advantage (2) mentioned above, in the case shown in FIGS. 9 and 10.

Figure 11:
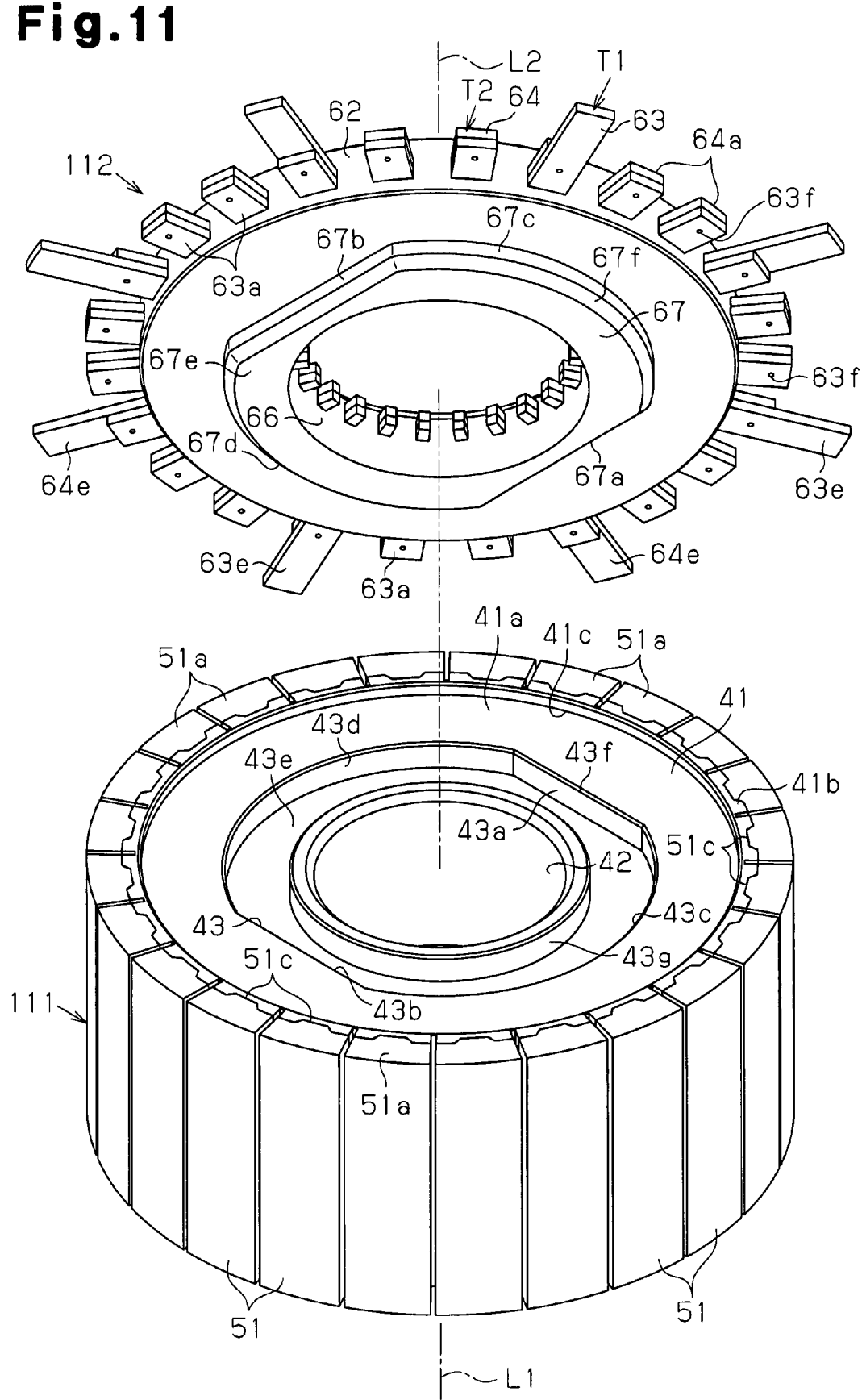
FIG. 11 is an exploded perspective view of a commutator according to a second embodiment of the present invention.
Figure 12:
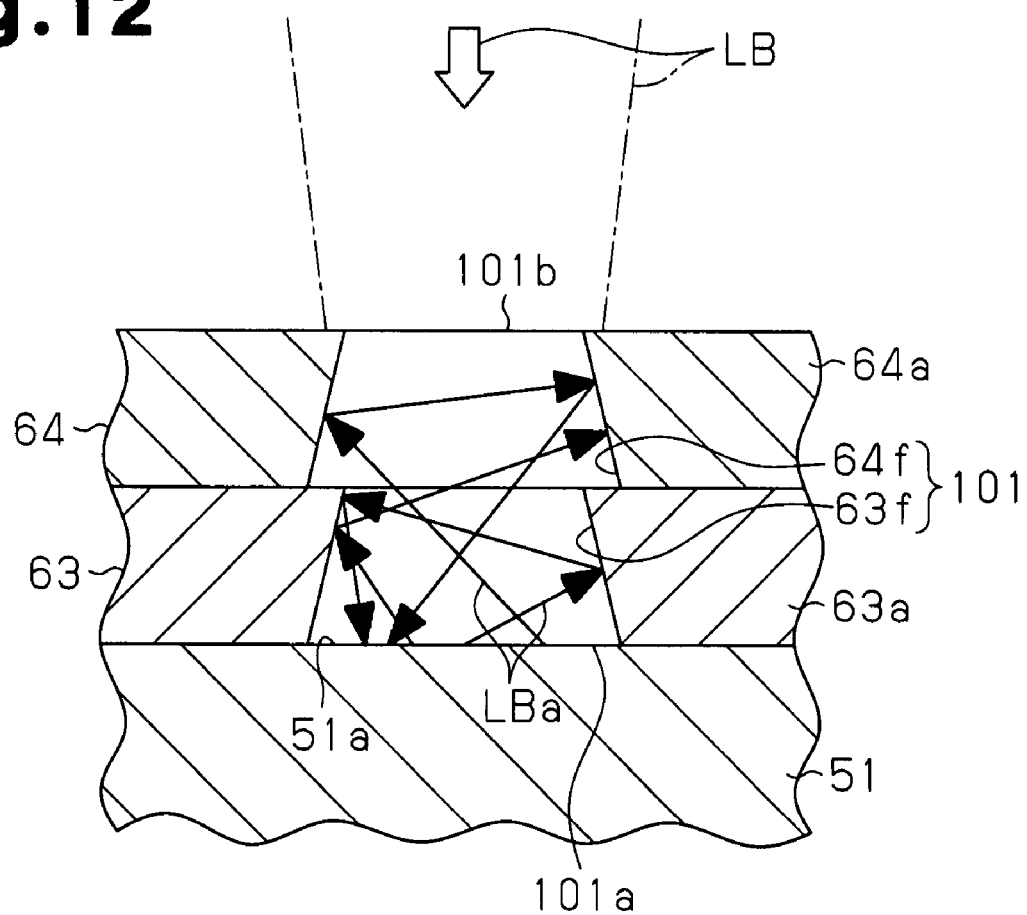
FIG. 12 is an enlarged cross-sectional view showing a manufacturing method of the commutator in FIG. 11.

FIGS. 11 and 12 show a commutator main body 111 and a short-circuit member 112 in accordance with a second embodiment of the present invention. The same reference numerals are attached to the same members as those of the first embodiment, and the description thereof will be omitted.

As shown in FIG. 11, the connection pins 51b are deleted from the layout surfaces 51a of the segments 51.

Each of the segments 51 has an engagement projection 51c protruding to a radially inner side. Each engagement projection 51c is positioned at the center in the circumferential direction of the corresponding segment 51. The dimension in the axial direction of each engagement projection 51c corresponds to the dimension in the axial direction of the corresponding segment 51.

An insulating body 41 in FIG. 11 has the same number of outer edge projections 41b as the segments 51. Each of the outer edge projections 41b protrudes in the axial direction from the first axial end surface 41a. The outer edge projections 41b are arranged in the circumferential direction, and an insulating portion 62 is loosely fitted partly to the loosely fit recess 41c defined by the outer edge projections 41b. The axial end surface of the outer edge projection 41b is flush with the layout surface 51a. Each of the outer edge projections 41b sandwiches the engagement projection 51c, whereby the segments 51 are engaged with the insulating body 41. In other words, the segments 51 in FIG. 11 are engaged with the insulating body 41 over the whole of the axial direction, and is prevented from being peeled from the insulating body 41. In other words, the outer edge projections 41b prevent the layout surfaces 51a of the segments 51 from separating from the insulating body 41.

The engagement projection 51c has a great number of small protrusions (not shown). A protruding amount of each of the small protrusions is slight, and the small protrusions are distributed over the axial direction of the engagement projection 51c. The small protrusions are engaged with the insulating body 41, whereby the engagement projection 51c is firmly engaged with the insulating body 41.

As shown in FIG. 11, an outer circumferential edge of the restriction recess 43 in the insulating body 41 is chamfered, and the first tapered surface 43f is formed. The diameter of the annular first tapered surface 43f is increased toward the first axial end surface 41a.

As shown in FIG. 11, a cylindrical portion 43g protrudes in the axial direction from the bottom surface 43e of the restriction recess 43. The cylindrical portion 43g exists in a circumferential edge of the press-fitting hole 42. An axial end surface of the cylindrical portion 43g is at the same height as the first axial end surface 41a.

As shown in FIG. 11, the cylindrical portion 43g is press-fitted to the insertion hole 66 in the insulating portion 62. The diameter of the insertion hole 66 is equal to an outer diameter of the cylindrical portion 43g.

An outer edge in the distal end of the restriction projection 67 in FIG. 11 is chamfered, and a second tapered surface 67f is formed. The diameter of the annular second tapered surface 67f is reduced in accordance toward a distal end surface 67e. Similar tapered surfaces are slightly formed on an outer circumferential surface of the insulating portion 62, and a radially inner surface of the outer edge projection 41b. A part of the insulating portion 62 can be loosely fitted to the loosely fit recess 41c, and an outer diameter of the insulating portion 62 is equal to the diameter of the loosely fit recess 41c.

A first through hole 63f is formed in each first radially outer end 63a, and a second through hole 64f is formed in each second radially outer end 64a. As shown in FIG. 12, the first and second radially outer ends 63a and 64a in a state of being overlapped with each other form a combined through hole 101. The combined through hole 101 has a first opening 101a existing in the first radially outer end 63a, and a second opening 101b existing in the second radially outer end 64a. Each first opening 101a opposes to the layout surface 51a of the corresponding segment 51. The second opening 101b opposes the armature core 22. The first and second through holes 63f and 64f are formed respectively in the corresponding first and second radially outer ends 63a and 64a before the first and second radially outer ends 63a and 64a are partly welded to each other. The diameter of each of the first and second through holes 63f and 64f is changed over the axial direction, and is increased toward the layout surface 51a.

As shown in FIG. 11, the first risers 63e are provided in some of the first radially outer ends 63a that are arranged every 90° interval in the circumferential direction, and the second risers 64e are also provided in the second radially outer ends 64a at an interval of 90° in the circumferential direction. The first risers 63e are not overlapped with the second risers 64e, but are arranged so as to be deviated from each other at 45° in the circumferential direction. Accordingly, the short-circuit member 112 is thinned and the material is reduced.

As shown in FIG. 12, in a state in which the layout surface 51a of the segment 51 closes the first opening 101a of the combined through hole 101, a laser beam LB is irradiated around the second opening 101b. The laser beam LB passes through the combined through hole 101 and is also irradiated onto the layout surface 51a. As a result, the first radially outer ends 63a, the second radially outer ends 64a and the segments 51 are bonded to each other. FIG. 12 shows one of the first radially outer ends 63a, the corresponding second radially outer end 64a, and the corresponding segment 51 before being welded by the laser beam LB.

Next, a description will be given of a method of assembling the short-circuit member 112 in the commutator main body 111. First, the short-circuit member 112 is moved close to the commutator main body 111, and the first radially outer ends 63a, the second radially outer ends 64a and the segments 51 are overlapped in the axial direction as shown in FIG. 12. The restriction projection 67 shown in FIG. 11 is press-fitted to the restriction recess 43, the cylindrical portion 43g is press-fitted to the insertion hole 66, and the insulating portion 62 is loosely fitted to the loosely fit recess 41c. The first and second through holes 63f and 64f form the combined through hole 101. The layout surface 51a of the segment 51 closes the first opening 101a.

Next, the laser beam LB is irradiated around the second opening 101b, that is, to the second radially outer end 64a from above in FIG. 12. The laser beam LB passes through the combined through hole 101, is irradiated onto the layout surface 51a, and welds the first radially outer end 63a, the second radially outer end 64a and the segment 51 to each other. In other words, the first radially outer end 63a, the second radially outer end 64a, and the segment 51 are electrically connected in accordance with the laser welding. In accordance with this, the commutator 23 is manufactured.

Unlike the case shown in FIGS. 1 to 7B, the first and second radially outer ends 63a and 64a in FIGS. 11 and 12 are not brought into contact with the segments 51 from the circumferential direction. Accordingly, the low dimensional accuracy of each of the members of the commutator 23 is allowed. In detail, it is possible to allow a low relative positional precision of the first and second flat side surfaces 43a and 43b of the restriction recess 43 with respect to the segments 51. Further, it is possible to allow a low relative positional precision of the third and fourth flat side surfaces 67a and 67b of the restriction projection 67 with respect to the first and second radially outer ends 63a and 64a. Further, in accordance with the aspect in FIGS. 11 and 12, it is not necessary to bring the first and second radially outer ends 63a and 64a into contact with the connection pins 51b from the circumferential direction, unlike the case in FIGS. 1 to 7B. In other words, in accordance with the aspect in FIGS. 11 and 12, it is not necessary to regulate the relative positional precision of the first and second radially outer ends 63a and 64a with respect to the connection pins 51b, unlike the case in FIGS. 1 to 7B.

The laser beam LB is irradiated around the second opening 101b of the combined through hole 101. At the same time, since the laser beam LB is irradiated onto the layout surface 51a, energy of the laser beam LB is directly applied to each of the first radially outer end 63a, the second radially outer end 64a, and the segment 51. The laser beam LB irradiated onto the layout surface 51a of the segment 51 is reflected, and reflected laser beam LBa is irradiated onto the inner surface of the combined through hole 101. Accordingly, an inner surface of the combined through hole 101 is exposed to the energy of the laser beam LB. Accordingly, the first radially outer end 63a, the second radially outer end 64a, and the segment 51 are well bonded by a low energy.

As shown in FIG. 12, each of the first through hole 63f and the second through hole 64f is increased in the diameter toward the layout surface 51a of the segment 51. In other words, the second opening 101b of the combined through hole 101 is narrowed in comparison with the first opening 101a. Accordingly, the reflected laser beam LBa generated by the laser beam LB being reflected on the layout surface 51a tends to repeat irregular reflections on the inner surface of the combined-through hole 101 and the layout surface 51a. In other words, the reflected laser beam LBa is hard to escape to the outside from the combined through hole 101. Accordingly, it is possible to reduce the reflected laser beam LBa that does not contribute to the laser welding. Therefore, the first radially-outer end 63a, the second radially outer end 64a, and the segment 51 are well bonded by a further lower energy.

At a time of fitting the short-circuit member 112 to the commutator main body 111, the first tapered surface 43f guides the second tapered surface 67f. Accordingly, it is possible to prevent an axial displacement of the short-circuit member 112 with respect to the commutator main body 111, and it is possible to easily execute an assembling work of the short-circuit member 112 with respect to the commutator main body 111. In other words, it is possible to easily position the short-circuit member 112 in the commutator main body 111.

The restriction projection 67 is press-fitted to the restriction recess 43, and the cylindrical portion 43g is press-fitted to the insertion hole 66. Accordingly, the first axis L1 of the commutator main body 111 comes into line with the second axial L2 of the short-circuit member 112 at a high precision. Further, the insulating portion 62 is loosely fitted to the loosely fit recess 41c. Therefore, the outer edge projection 41b having the small radial dimension is prevented from being exposed to the radial stress so as to be deformed. As a result, it is possible to prevent a roundness of the outer circumferential surface constituted by a plurality of segments 51 from being lowered. In other words, the anode brush 10 and the cathode brush 11 stably come into slidable contact with the segments 51.

Each of the embodiments mentioned above may be modified as follows.

The diameters of the first through hole 63f and the second through hole 64f shown in FIG. 12 may be fixed over an expanding direction (the axial-direction).

The first and second risers 64e and 64e to which the coils 24a to 24h are electrically connected are not limited to be provided in the first and second radially outer ends 63a and 64a, but may be provided in the segments 51.

As far as it is possible to allow the first coupling portions 63c to be in non-contact with the second coupling portions 64c in the axial direction, it is possible to omit one of the first separation recess 63d in the first short-circuit piece 63, and the second separation recess 64d in the second short-circuit piece 64.

The first coupling portions 63c may be made in non-contact with the second coupling portions 64c by arranging an insulating paper between the first coupling portions 63c and the second coupling portions 64c. In the case of using the insulating paper, the respective thicknesses of the first and second coupling portions 63c and 64c may be set equal to the respective thicknesses of the first and second radially outer ends 63a and 64a.

The insulating portion 62 may have the restriction recess 43, and the insulating body 41 may have the restriction projection 67.

The coils 24a to 24h are not limited to be concentrically wound around the teeth 22a to 22h, but may be wound by way distributed winding.

The number of the magnets 6 provided in the stator 2 is not limited to six, but may be set to 2n (n is a natural number). The number of the coils 24a to 24h provided in the armature 3 is not limited to eight, but may be set to any plural number. In other words, the number of the field poles of the direct-current motor 1 is not limited to six, and the number of the salient magnetic poles is not limited to eight.

What is claimed is:

1. A manufacturing method of a commutator, comprising:
    arranging a plurality of segments in an outer circumference of a cylindrical insulating body;
    preparing a plurality of first short-circuit pieces and a plurality of second short-circuit pieces, each of the first short-circuit pieces having a first radially outer end, a first radially inner end arranged at a position which is circumferentially deviated from and radially inside of the first radially outer end, and a first coupling portion coupling the first radially outer end to the first radially inner end, and each of the second short-circuit pieces having a second radially outer end, a second radially inner end arranged at a position which is circumferentially deviated from and radially inside of the second radially outer end, and a second coupling portion coupling the second radially outer end to the second radially inner end;
    forming a first through hole and a second through hole respectively in the first radially outer end and the second radially outer end which are in a separated state from each other;
    forming a combined through hole by overlapping each first radially outer end with the corresponding second radially outer end so as to communicate the first through hole with the second through hole, the combined through hole having a first opening and a second opening in an opposite side to the first opening;
    forming a tabular insulating portion covering the first coupling portion and the second coupling portion;
    forming a restriction recess in one of the insulating body or the tabular insulating portion, and forming a restriction projection in the other;
    engaging the restriction projection with the restriction recess;
    closing the first opening by a layout surface corresponding to an end surface in an axial direction of the segment; and
    irradiating a laser beam onto at least a part of the circumference of the second opening, the laser beam passing through the combined through hole so as to be irradiated onto the layout surface, whereby the first radially outer end, the second radially outer end and the segment are welded.

* * * * *